United States Patent
Jones, Jr.

(10) Patent No.: US 7,021,450 B2
(45) Date of Patent: Apr. 4, 2006

(54) DEVICE AND METHOD TO CORRECT UNEVEN SPACING OF SUCCESSIVE ARTICLES

(75) Inventor: Theodore E. Jones, Jr., Morris Township, NJ (US)

(73) Assignee: Kraft Foods Holdings, Inc., Northfield, IL (US)

( * ) Notice: Subject to any disclaimer, the term of this patent is extended or adjusted under 35 U.S.C. 154(b) by 211 days.

(21) Appl. No.: 10/124,092

(22) Filed: Apr. 17, 2002

(65) Prior Publication Data

US 2003/0196871 A1    Oct. 23, 2003

(51) Int. Cl.
*B65G 47/31*      (2006.01)

(52) U.S. Cl. .............. 198/462.1; 198/460.3; 198/418.9

(58) Field of Classification Search ............ 198/462.1, 198/418.9, 442, 460.3, 535, 572, 575, 576, 198/578, 579
See application file for complete search history.

(56) References Cited

U.S. PATENT DOCUMENTS

| | | | |
|---|---|---|---|
| 2,708,863 A | 5/1955 | Payne | |
| 3,403,033 A | 9/1968 | Griner | |
| 3,429,416 A | 2/1969 | Provost et al. | |
| 3,590,972 A * | 7/1971 | Mosterd | 198/20 |
| 3,610,401 A * | 10/1971 | Herendeen et al. | 198/418.9 |
| 3,636,828 A * | 1/1972 | Achelpohl | 198/418.8 |
| 3,638,538 A | 2/1972 | Sullivan | |
| 3,643,940 A * | 2/1972 | Lopez | 271/202 |
| 3,834,288 A * | 9/1974 | Behrens et al. | 198/418.9 |
| 3,842,719 A * | 10/1974 | Fernandez-Rana et al. | 198/418.9 |
| 3,870,139 A * | 3/1975 | Wagner | 198/418.9 |
| 3,874,522 A | 4/1975 | Rana | |
| 3,881,721 A * | 5/1975 | Hitch | 271/184 |
| 3,948,153 A * | 4/1976 | Dutro et al. | 198/418.9 |
| 3,964,598 A | 6/1976 | Alsop | 198/35 |
| 4,004,678 A * | 1/1977 | Hardy | 198/460.2 |
| 4,018,326 A * | 4/1977 | Hardy | 198/461 |
| 4,020,614 A * | 5/1977 | Smithers | 270/40 |
| 4,045,014 A * | 8/1977 | Karlsson | 271/8.1 |
| 4,075,359 A | 2/1978 | Thulin | |
| 4,076,114 A * | 2/1978 | Tokuno | 198/425 |
| 4,135,616 A * | 1/1979 | Pellaton | 198/423 |
| 4,141,442 A | 2/1979 | Cole et al. | |
| 4,155,441 A * | 5/1979 | Albrecht et al. | 198/424 |
| 4,194,300 A | 3/1980 | Swanson et al. | |
| 4,210,237 A * | 7/1980 | Gram | 198/419.2 |
| 4,214,743 A * | 7/1980 | Meier | 271/182 |
| 4,238,024 A * | 12/1980 | Hirakawa et al. | 198/425 |
| 4,240,856 A * | 12/1980 | Craemer et al. | 156/205 |
| 4,266,654 A * | 5/1981 | Achelpohl et al. | 198/425 |
| 4,281,756 A | 8/1981 | Bruno | |
| 4,282,964 A | 8/1981 | Hogenkamp et al. | |

(Continued)

FOREIGN PATENT DOCUMENTS

EP      0 259 650 A2      3/1988

*Primary Examiner*—Gene O. Crawford
*Assistant Examiner*—Rashmi Sharma
(74) *Attorney, Agent, or Firm*—Hollander Law Firm, P.L.C.

(57) ABSTRACT

A device for correcting uneven spacing of successive articles includes a first conveyor belt having a plurality of articles spaced thereon. At least one article is unevenly spaced. A second conveyor belt is located downstream of the first conveyor belt upon which the plurality of articles are evenly spaced or shingled. A controller moves forwards and backwards, thereby extending or retracting a discharge end of the first conveyor belt and allowing uniform spacing or stacking of the articles on the second conveyor belt.

21 Claims, 13 Drawing Sheets

U.S. PATENT DOCUMENTS

| | | | |
|---|---|---|---|
| 4,469,219 A * | 9/1984 | Cosse | 198/460 |
| 4,522,384 A * | 6/1985 | Beckley | 270/52.29 |
| 4,546,871 A * | 10/1985 | Duke | 198/418.9 |
| 4,565,363 A | 1/1986 | Faltin | |
| 4,577,746 A * | 3/1986 | Tokuno et al. | 198/462.2 |
| 4,585,227 A * | 4/1986 | Muller | 271/270 |
| 4,678,418 A | 7/1987 | Thulin | |
| 4,684,008 A | 8/1987 | Hayashi et al. | |
| 4,712,356 A | 12/1987 | Hardage et al. | |
| 4,736,570 A | 4/1988 | Hardage et al. | |
| 4,746,004 A * | 5/1988 | Hess et al. | 198/423 |
| 4,960,198 A | 10/1990 | Hogenkamp | |
| 4,962,844 A * | 10/1990 | Francioni | 198/460.3 |
| 4,995,506 A * | 2/1991 | Langenbacher et al. | 198/814 |
| 5,020,305 A * | 6/1991 | Treiber | 53/500 |
| 5,022,644 A * | 6/1991 | Burge | 271/270 |
| 5,035,315 A | 7/1991 | Fukusaki et al. | |
| 5,046,603 A * | 9/1991 | Odenthal | 198/812 |
| 5,078,255 A | 1/1992 | Haley | |
| 5,095,684 A | 3/1992 | Walker et al. | |
| 5,100,124 A * | 3/1992 | Pouliquen | 271/183 |
| 5,308,223 A | 5/1994 | Sternheimer et al. | |
| 5,419,677 A * | 5/1995 | Cohn | 414/789.5 |
| 5,439,096 A | 8/1995 | Shigematsu et al. | |
| 5,640,833 A | 6/1997 | Gerber | |
| 5,761,883 A | 6/1998 | Pruett et al. | |
| 5,893,701 A | 4/1999 | Pruett | |
| 5,957,050 A | 9/1999 | Scheffer et al. | |
| 6,338,482 B1 | 1/2002 | Geske et al. | |
| 6,409,462 B1 | 6/2002 | Newsome et al. | |
| 6,543,989 B1 | 4/2003 | Derenthal et al. | |

* cited by examiner

NORMAL POSITION

RETRACTED POSITION

EXTENDED POSITION

T / Pitch = sin (Theta)

arcsin(T / Pitch) = Theta

Pitch = T / sin(Theta)

DEVICE AND METHOD TO CORRECT UNEVEN SPACING OF SUCCESSIVE ARTICLES

FIELD OF INVENTION

The present invention is directed to a device and method that takes successive articles with uneven spacing proceeding down a first conveyor and puts the articles substantially evenly spaced on a second conveyor.

BACKGROUND OF INVENTION

U.S. Pat. No. 4,155,441 to Albrecht et al. discloses a conveyor system for separating columns of articles into spaced groups, each group containing a predetermined number of articles. The columns of articles are fed onto a conveyor having an extendable noser arrangement at the output end that is positioned over the input end of a second conveyor. The noser arrangement is extended to prevent the flow of articles from the first conveyor to the second, faster conveyor, thereby providing a space on the second conveyor between successive groups or articles. During extension of the noser arrangement, no articles are transferred since the noser arrangement extends the conveyor at the same rate that the articles are carried toward the end of the conveyor. A photoelectric device counts the articles as they are transferred and actuates the noser extending mechanism. U.S. Pat. No. 4,155,441 does not disclose changes in the noser arrangement due to the detection of an unevenly spaced article. In addition, this patent does not disclose continuous correcting of unevenly spaced articles during transfer to a second conveyor belt.

Devices for shingling articles are known. For example, FIG. 1A shows a side view of a typical shingle stacking conveyor arrangement. The speed of the first belt (V1) is faster than the speed of the second belt (V2). This causes the articles on the second belt to be spaced closer together and to overlap or shingle. FIG. 1A shows an article that is ahead of where it would be if it were evenly spaced, causing it to arrive early at the second conveyor. FIG. 1B shows an article that is behind the position it would occupy if it were evenly spaced, causing it to arrive late at the second conveyor.

The effect of uneven article spacing on the first conveyor is to cause an uneven article spacing on the second conveyor, which results in an uneven shingle pattern (i.e., the articles are shingled at different angles). If the product arrives sufficiently ahead or behind of an evenly-spaced position, then the shingle pattern can be lost altogether, resulting in articles being piled on top of each other in a random manner, as shown in FIG. 1C.

Randomly spaced or randomly stacked products is not just a matter of aesthetics. Unevenly distributed product does not go through conveyor systems to wrapping systems well. Any disruption in the pattern of products only gets worse as it makes its way to wrapping. Loss of product overlap, buckled product, and product jams all occur with regularity. When the disordered product arrives at the wrappers, it is prone to jam in chutes, feed mechanisms, infeed track, and the like. As a result, serious product breakage and wrapper downtime occurs. The present invention provides an apparatus that can take a single row of unevenly spaced articles on a first conveyor and ensures that the articles are more evenly spaced or more evenly stacked on a second conveyor.

SUMMARY OF INVENTION

The device according to the present invention puts a plurality of articles on even centers by moving a discharge end (i.e., noser) of a first conveyor upstream or downstream. As a result, the point of arrival for an article on a second conveyor may be moved upstream or downstream, thereby correcting the spacing of the article on the second belt, with or without shingling. For shingled articles, a consistent shingle angle is achieved on the second conveyor. The device does not require an additional piece of machinery or other apparatus to touch the articles in order to achieve proper spacing. As a result, breakage of fragile articles is unlikely to occur.

The device according to the present invention may be used with articles that are relatively thin in proportion to their overall size. Such products may be shingle-stacked by transferring from a faster conveyor to a slower conveyor, usually at a lower elevation in order to obtain a smooth transfer of articles.

DETAILED DESCRIPTION OF THE INVENTION

Figure 1A:
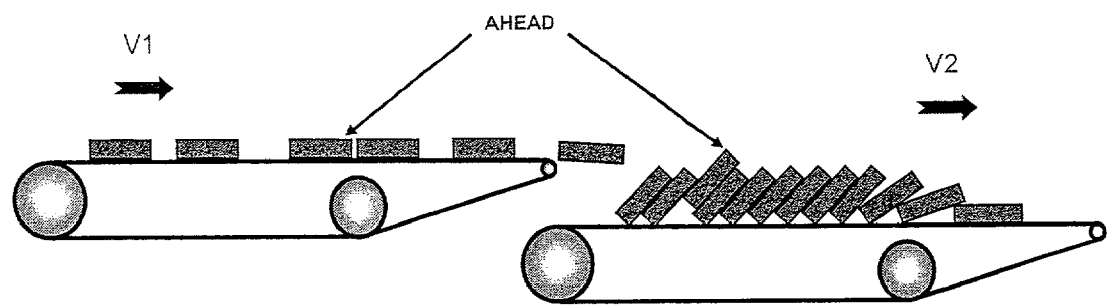
FIG. 1A shows a process of stacking or shingling articles in which an article is ahead of where it would be if it were evenly spaced.
Figure 1B:
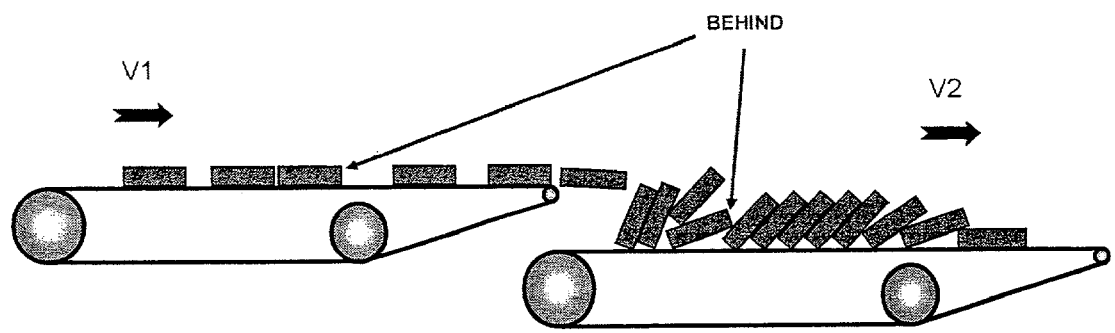
FIG. 1B shows a process of stacking or shingling articles in which an article is behind where it would be if it were evenly spaced.
Figure 1C:
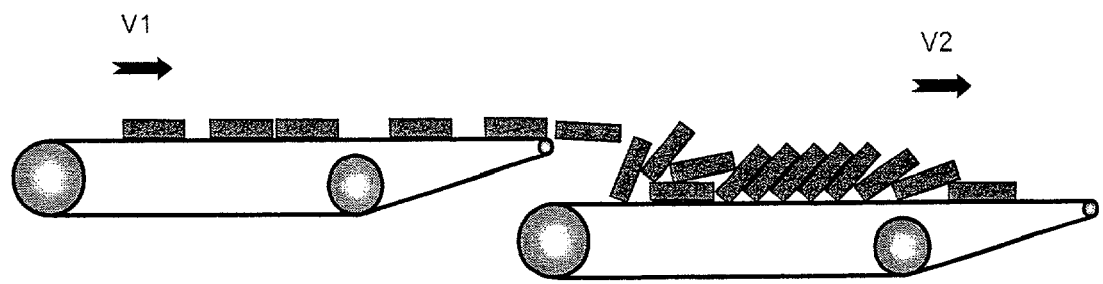
FIG. 1C shows the uneven stacking pattern resulting from uneven spacing of articles on a first conveyor.

The device according to the present invention may be used to correct the uneven spacing of successive articles on a first conveyor belt as the articles are transferred to a second conveyor belt, so that the articles are at least substantially evenly spaced or at least substantially evenly shingled on the second conveyor belt. The articles may be irregularly shaped or may be uniformly shaped, such as square, rectangular, or circular. The articles used in the process according to the present invention include, but are not limited to, food products such as cookies, crackers, biscuits, candies, and baked goods. The food product may be in the form of a strip having a plurality of perforated sections. The strip may extend across the width of the conveyor belt. Each strip may be separated into a plurality of uniformly-sized pieces by breaking the strips along the perforated lines. The articles may also be non-food products such as coins, newspapers, magazines, paper or plastic products, packages, and the like. The articles may also include packages that contain a plurality of food items, such as packages of cookies or crackers. The cookies or crackers in the packages may be slug-packed or arranged in trays. In accordance with the apparatus and method of the present invention, the articles are more evenly spaced on the second conveyor than on the first conveyor. Shingled articles on the second conveyor each have at least substantially the same angle relative to the surface of the second conveyor belt.

The device according to the present invention can be used for any process where there is a shingling or stacking operation accomplished by having articles on a first conveyor belt transferred to a second conveyor belt. In a shingling or stacking operation, a first conveyor belt runs faster than a second conveyor belt. The second conveyor belt is usually located at a lower elevation that the first conveyor belt. This causes the articles to overlap or shingle on the second conveyor belt.

The device according to the present invention can also be used to transfer unevenly spaced items on a first conveyor and uniformly space them, without stacking, on a second conveyor. In this case, the second conveyor belt may run at a slower or faster speed than the first conveyor belt. In this configuration, the first and second conveyor belts may be on the same or different levels. In non-stacking operations, preferably the first or upstream conveyor runs or travels at a higher speed than the speed of the second or downstream conveyor.

In the embodiments where the first belt moves faster than the second belt, a product article arriving at the discharge end of the first conveyor behind where it would be if evenly spaced can have its position corrected by staying on the first conveyor a bit longer. The extra time at the higher speed permits it to catch up. This can be accomplished by extending the noser of the first belt slightly downstream. Conversely, an article arriving early should exit the first conveyor a bit sooner. This can be accomplished by retracting the noser of the first belt slightly upstream. However, in embodiments where the second belt moves faster than the first belt, a product article arriving at the discharge end of the first conveyor behind where it would be if evenly spaced can have its position corrected by staying on the first conveyor a shorter time. The reduced time at the lower speed permits it to catch up. This can be accomplished by retracting the noser of the first belt slightly upstream. Conversely, an article arriving early should exit the first conveyor a bit later. This can be accomplished by extending the noser of the first belt slightly downstream. Generally, in each situation the noser should be moved a distance which is less than the pitch or distance to the following product or article on the first conveyor so as to avoid repositioning upstream products or articles.

Figure 2A:
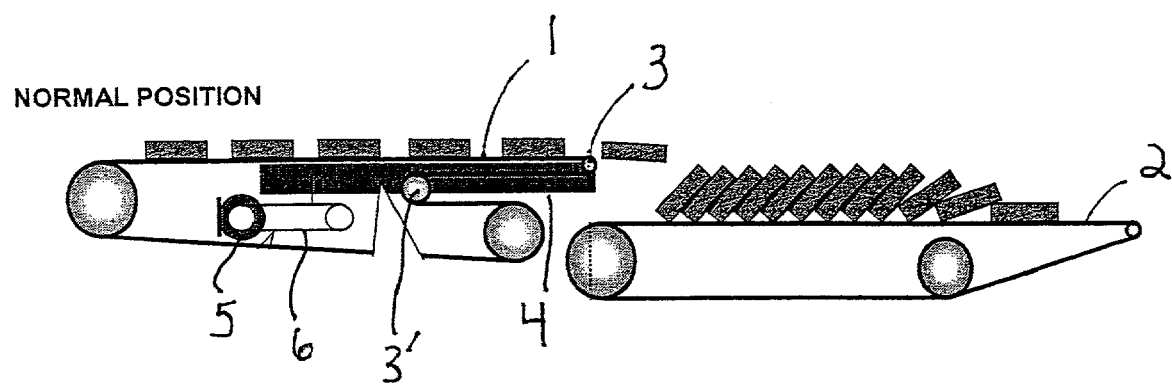
FIG. 2A shows a carriage in a normal position in a device according to the present invention.
Figure 2B:
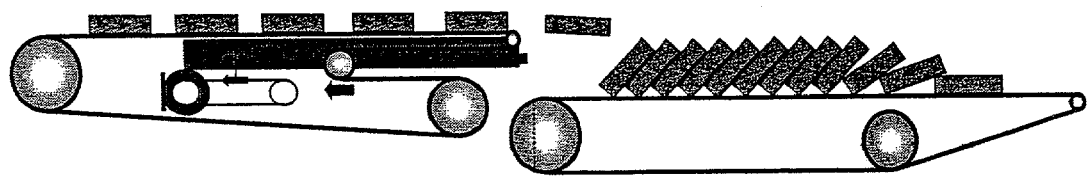
FIG. 2B shows the carriage of FIG. 2A in a retracted position.
Figure 2C:
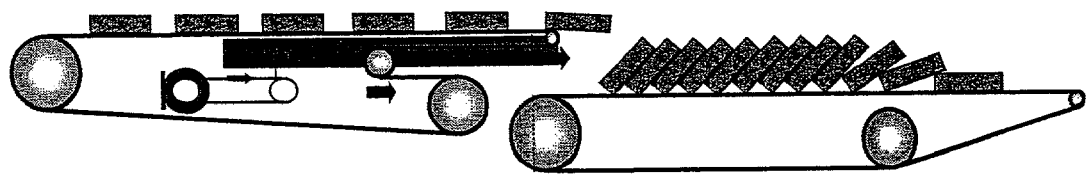
FIG. 2C shows the carriage of FIG. 2A in an extended position.

A device according to the present invention that can move the noser of the first conveyor either upstream or downstream, without affecting its operation, is shown in FIGS. 2A–2C. A first conveyor 1 and a second conveyor 2 are configured so as to allow shingling of articles from the first conveyor onto the second conveyor.

The noser or end of the first conveyor is moved by a device or controller. Preferably, the device comprises at least two rollers 3, 3' mounted on a single carriage 4. The carriage 4 can be moved back and forth and left to right, which causes the two rollers 3, 3' to move in tandem. One roller creates slack in the belt and the other roller takes up the corresponding slack. The carriage 4 can be moved in a number of ways. In an embodiment of the present invention, a servo motor 5 is used to move the carriage 4 by a timing belt 6. FIG. 2A shows the noser in a normal position when the articles on the first conveyor belt are evenly spaced. FIG. 2B shows the noser in a retracted position, and FIG. 2C shows the noser in an extended position.

Conventional nosers, belts, photoelectric or vision detection devices, servo motors, controls, retraction and extension mechanisms, and arrangements thereof may be employed in the present invention such as those described in U.S. Pat. No. 4,155,441 to Albrecht et al., the disclosure of which is incorporated by reference herein in its entirety.

Figure 3C:
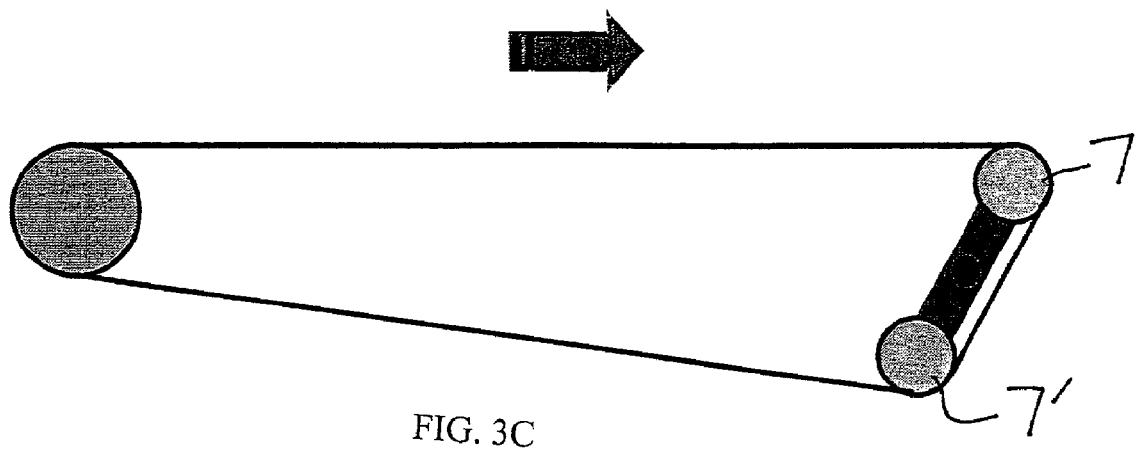
FIG. 3C shows the pivoting device of FIG. 3A in an extended position.
Figure 3B:
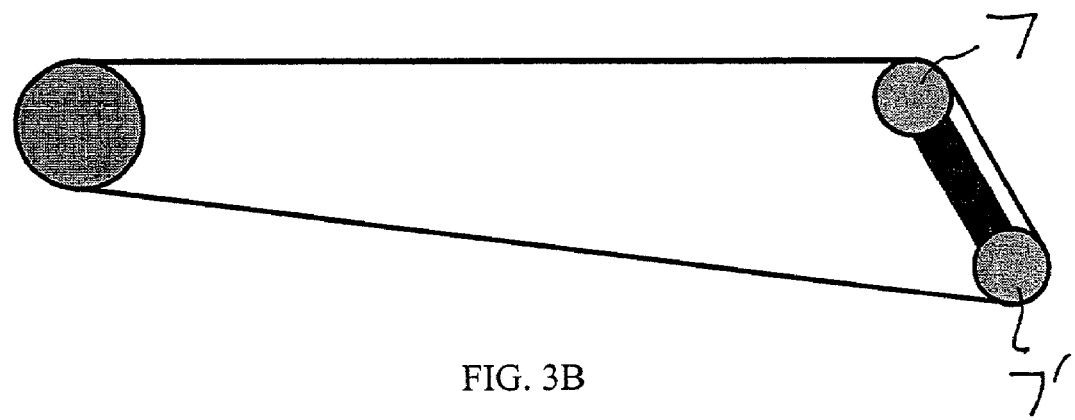
FIG. 3B shows the pivoting device of FIG. 3A in a retracted position.
Figure 3A:
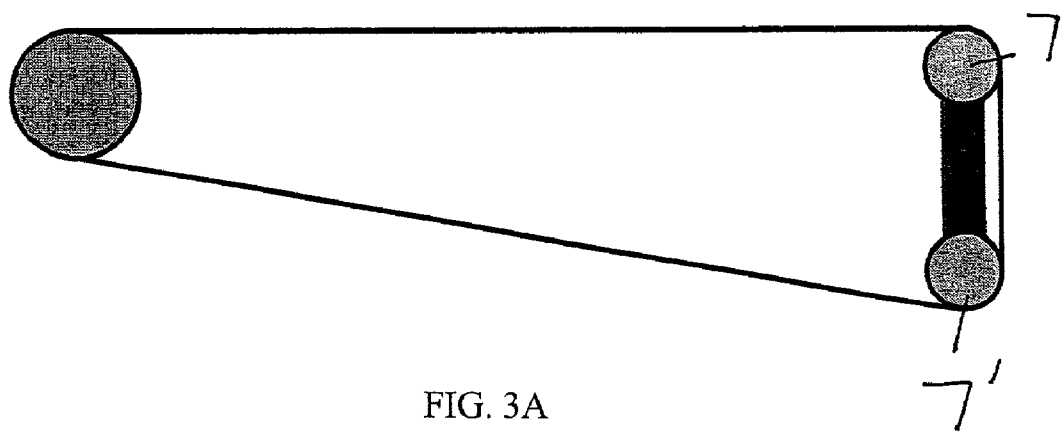
FIG. 3A shows an alternative embodiment where a pivoting device moves the noser of the first conveyor belt.
Figure 4:
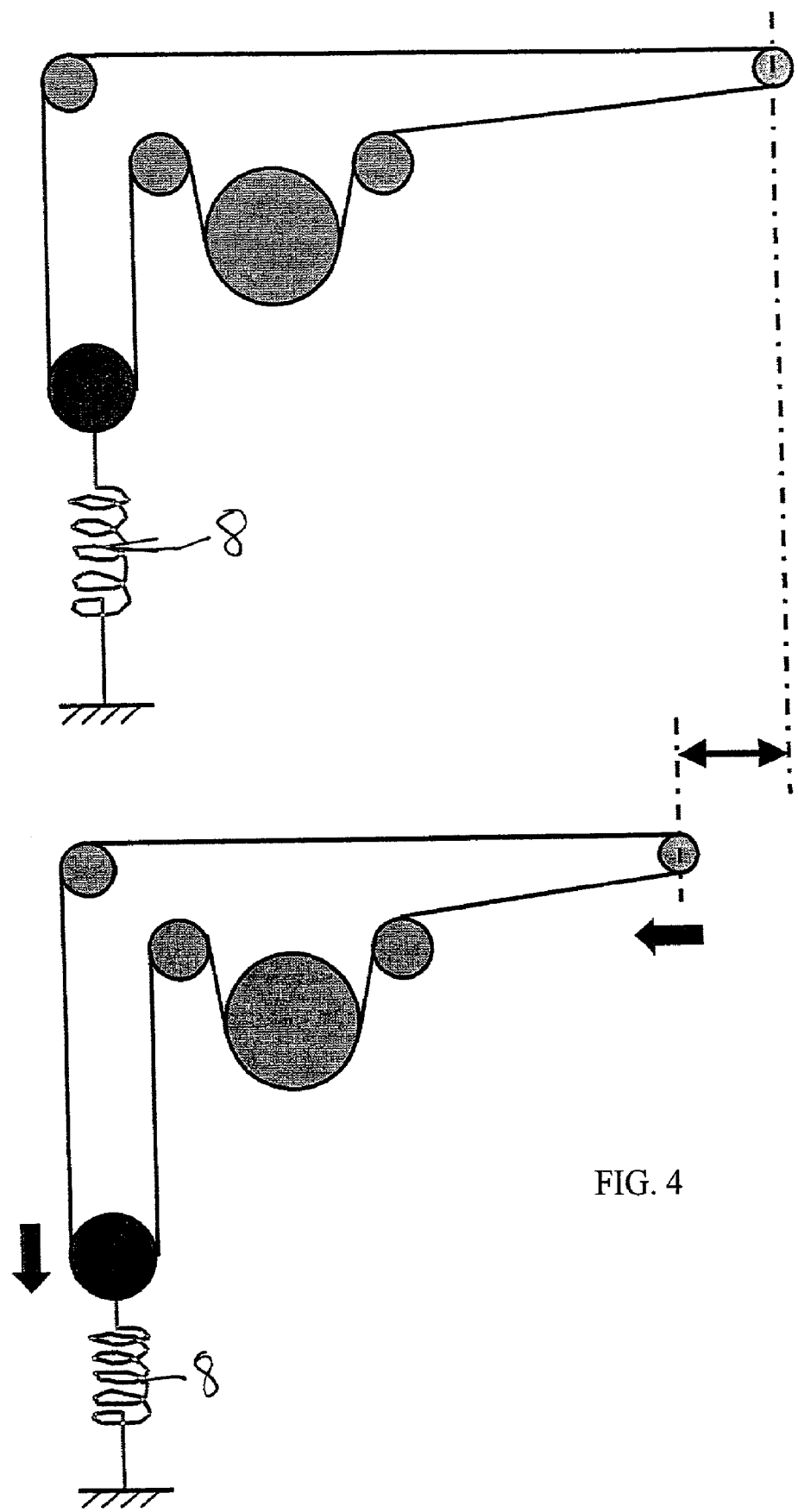
FIG. 4 shows an alternative embodiment where a spring device takes up belt slack when the noser of the first conveyer is retracted.
Figure 5:
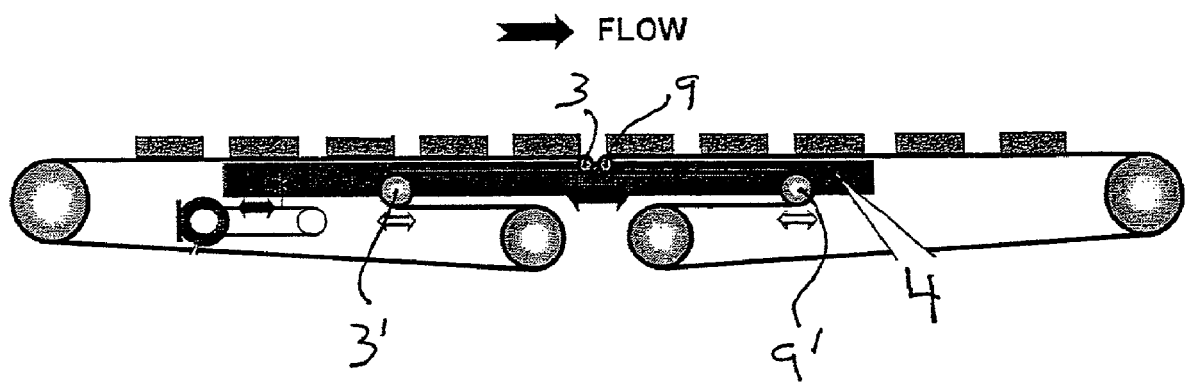
FIG. 5 shows a reciprocating double noser arrangement.

In other embodiments according to the present invention, the device for moving the noser may comprise two rollers 7, 7' pivotably connected to each other as shown in FIGS. 3A, 3B, and 3C in normal, retracted, and extended noser positions, respectively. An alternative device for moving the noser may include a spring-tensioned belt held in tension by a spring device 8, such as a coil spring, pneumatic cylinder, leaf spring, rubber band, or a weight, as shown in FIG. 4. When the first and second belts are on the same level, a reciprocating double noser arrangement can be used, as shown in FIG. 5. In the reciprocating double noser arrangement, a single carriage 4 moves at least two rollers 3, 3' on the first belt and at least two rollers 9, 9' on the second belt, thereby moving a noser of the first belt and a noser of the second belt. The nosers move together on carriage 4 and aid in the smooth transfer of articles that are not shingled.

Figure 6A:
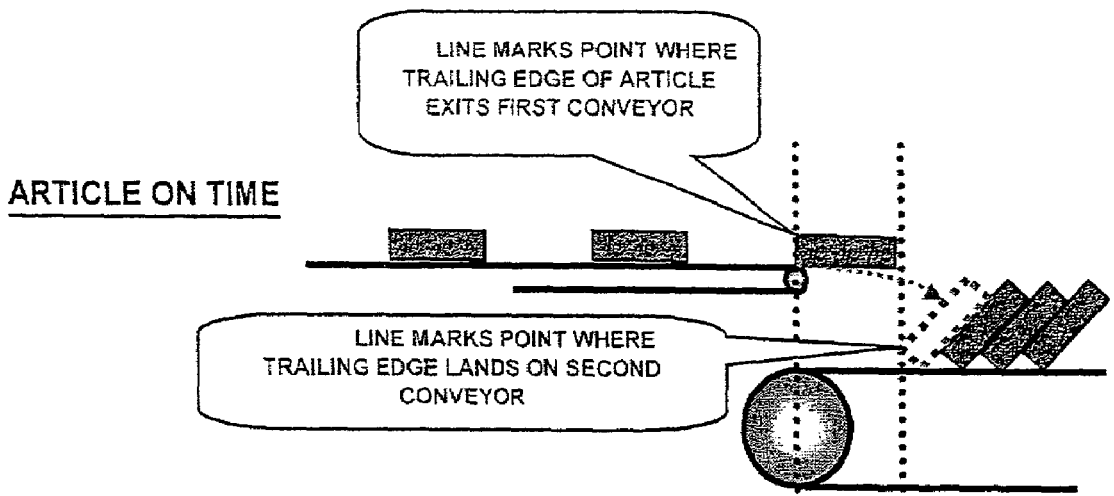
FIG. 6A shows a position of the noser when the articles are evenly spaced.
Figure 6B:
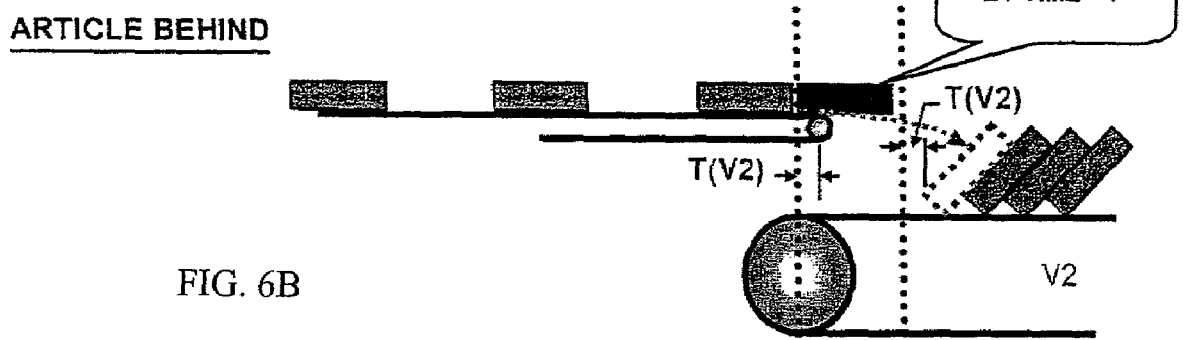
FIG. 6B shows the extended position of the noser due to an article behind in time.
Figure 6C:
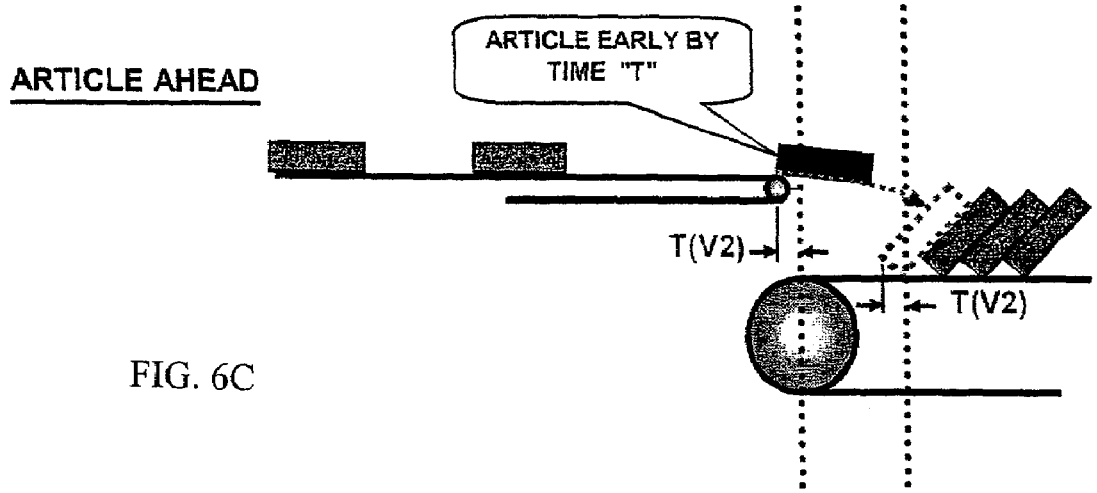
FIG. 6C shows the retracted position of the noser due to an article ahead in time.

The manner in which a position of an unevenly spaced article is corrected in a shingling operation, whether ahead or behind, is shown in FIGS. 6A–6C. In FIG. 6A, an article is evenly spaced, and thus the noser end of the first conveyor belt is in its normal position. In FIG. 6B, an article is late by time T, causing the desired landing space on the second conveyor belt to advance by T(V2). The noser of the first conveyor extends downstream by the same distance T(V2). In FIG. 6C, an article is early by time T, causing the desired landing space on the second conveyor belt to be upstream of its desired position by T(V2). Accordingly, the noser of the first conveyor retracts by the same distance T(V2).

Figure 7A:
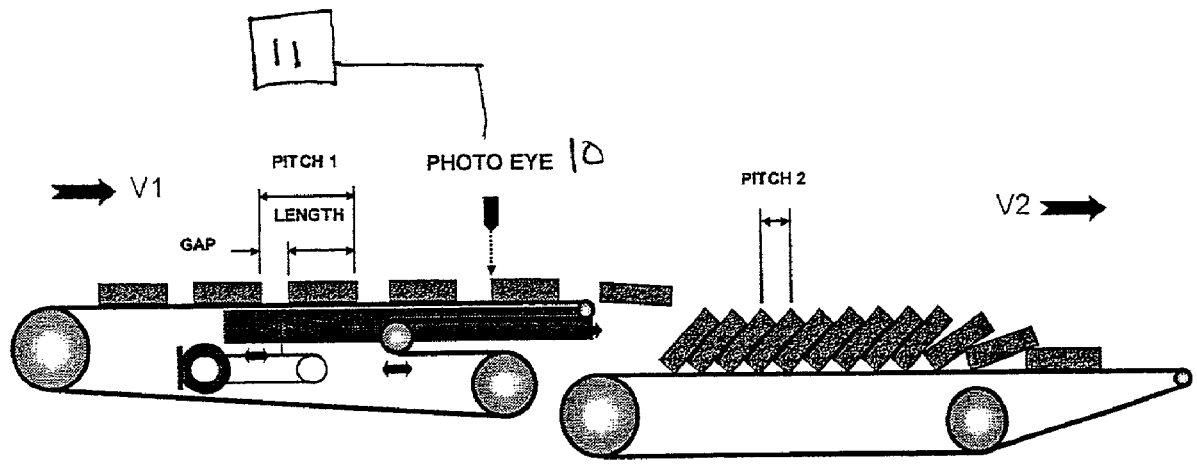
FIG. 7A shows a sensor mounted above the articles on the first conveyor belt.

The position of the articles (i.e., early, late, or on time) may be detected using at least one sensor mounted in a fixed position, as shown in FIG. 7A. The sensor may be at least one photoelectric eye 10 arranged above the first conveyor belt upstream of the noser. The sensor detects either a leading or trailing edge of each article. Preferably, the sensor transmits a signal upon detection of the trailing edge of each article. The signal is transmitted to a conventional computing and memory device 11 that compares the length, spacing, and pitch of the articles on the first conveyor belt to determine whether each article is appropriately spaced. The computing and memory device 11 then directs adjustment of the noser as needed.

Figure 7B:
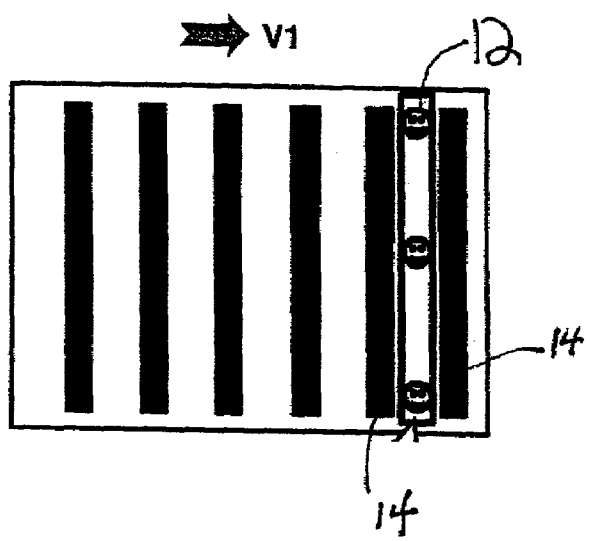
FIG. 7B shows a top view of an array of sensors mounted above the articles on the first conveyor belt.

In embodiments, an array of sensors can be used. For example, a linear array 12 of three sensors can be used to detect the position of articles in the form of strips 14 as shown in FIG. 7B. If a strip is offset at an angle across the width of the belt, the linear array 12 of sensors would detect a leading edge, medium position, and trailing edge of the strip. The computing and memory device would preferably be configured to direct the noser adjustment based upon either the medium position or trailing edge of the strip. However, if the memory device obtained a signal that was unclear, the noser could be adjusted to a standard position.

The time for the discharge end of the first conveyor belt to move is the time for one product pitch to go by on the first belt or (PITCH 1)/V1. However, the discharge end of the belt must not move when the article is exiting the first conveyor or else it might interfere with its trajectory. Also, the discharge end must complete a position-correcting move while part of a given article is still on the first belt. Thus, the actual available time is somewhat less than (PITCH 1)V1.

The pitch of the articles on the first and second conveyor belts, as well as the determination of the distance which the noser must be moved and at what acceleration, are discussed below:

I. Pitch and Shingle Angle

Figure 8:
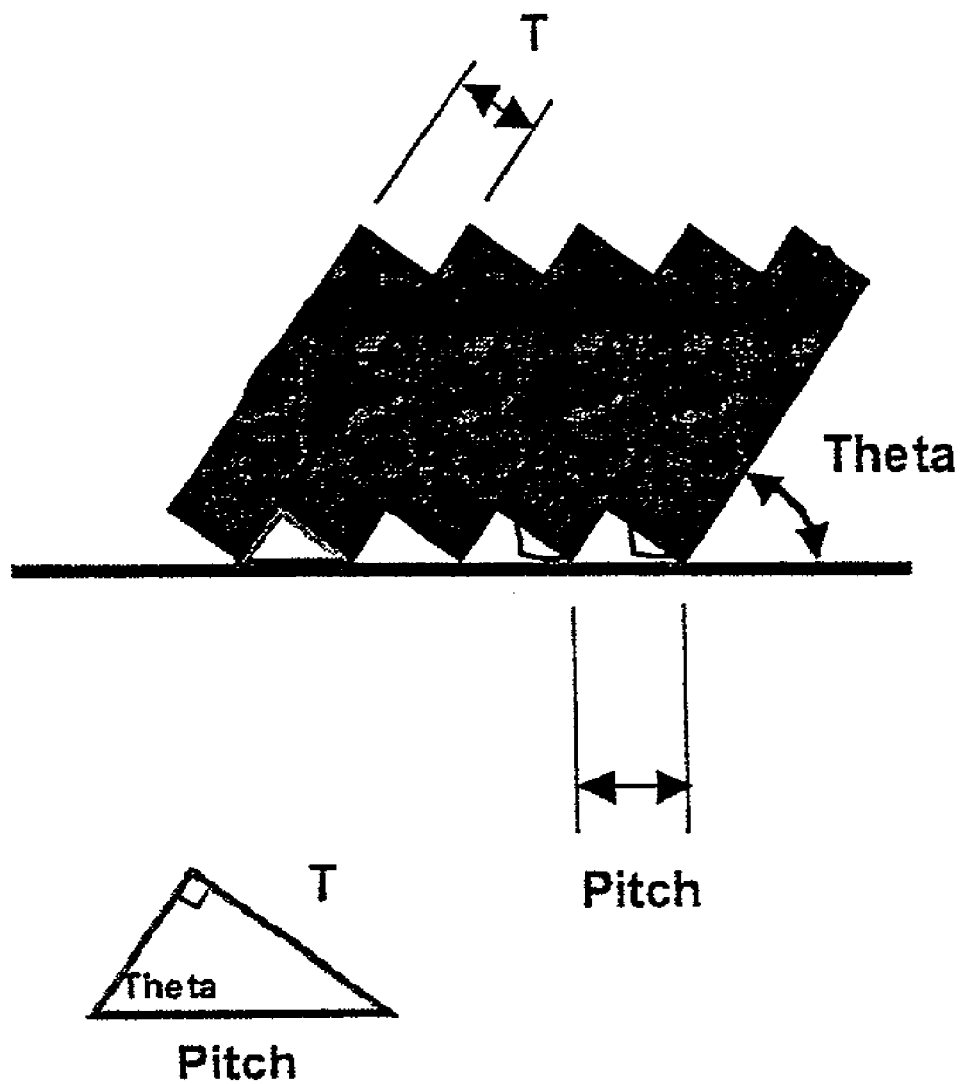
FIG. 8 shows the determination of pitch for shingled articles having the same angle of inclination.

As shown in FIG. 8, when articles of a thickness T are evenly stacked at an angle Theta, the pitch can be readily determined. Although the products are illustrated as rectangles, the calculation of pitch can also be applied to situations in which the products are not perfect rectangles. In FIG. 8, Pitch=T/sin (Theta). In embodiments of the present invention, the articles on the first conveyor are not stacked and lie flat, so the pitch is the length of the article plus the gap between it and the following article (FIG. 7A). The angle Theta for the articles on the second conveyor may be 0° (not stacked) to about 45°, preferably about 5° to about 30°, relative to the surface of the second conveyor belt. The angle Theta for each article should be at least substantially the same.

II. Distance and Timing of Noser Movements

The pitch of the article on the first conveyor belt (P1) and on the second conveyor belt (P2) can be used to determine the distance and time that the noser should move based upon the detected position of each article.

In FIGS. 9–13, the articles are represented schematically as cakes that are shingled. Although the figures illustrate situations in which an article such as a cake is at the outside range of being early or late, the resulting equations allow for variable adjustment of the noser depending upon any detected position of the articles.

Figure 9:
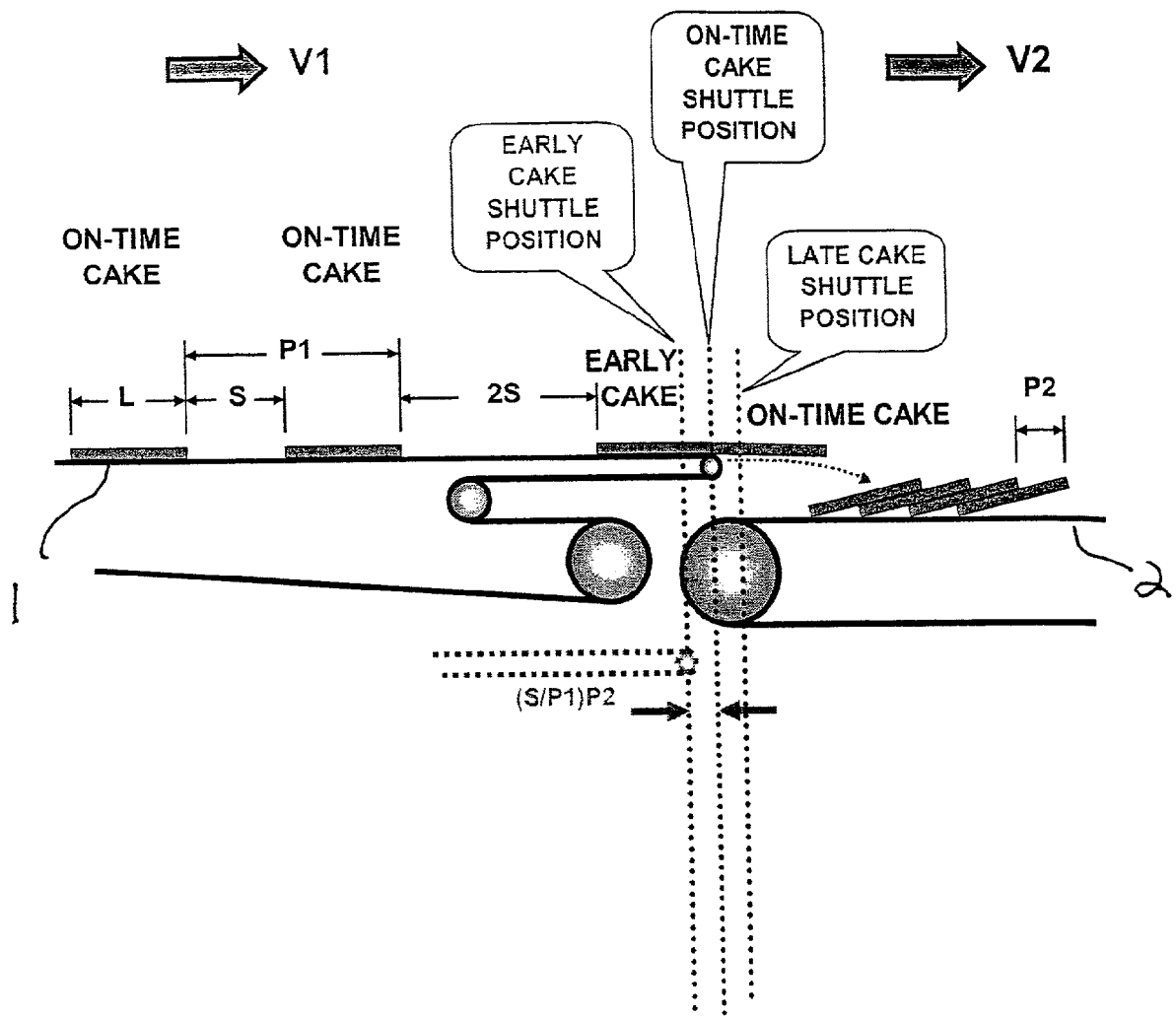
FIG. 9 shows the distance the noser must be retracted when an on-time cake is followed by an early cake.

FIG. 9 illustrates an on-time cake followed by an early cake, which is ahead of its assigned, equally-spaced position by a distance S. Assuming that the on-time cake must be all the way off the noser before the noser can move, the noser must retract a distance of (S/P1)P2 to get to the early position. The noser must complete this move by the time the early cake has at least about ⅓ of itself still on belt 1. In sum, the early cake must move a distance of (⅔)L−(S/P1)P2. The time available for this move is [(⅔)L−(S/P1)P2]/V1.

Figure 10:
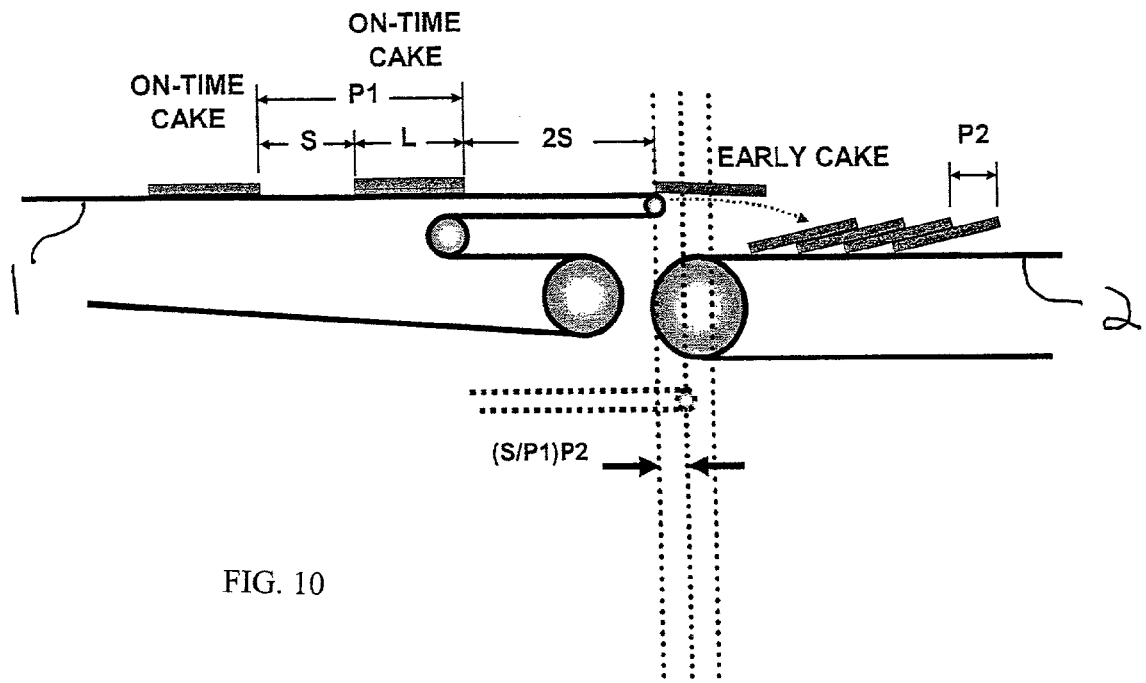
FIG. 10 shows the distance the noser must be extended when an early cake is followed by an on-time cake.

If an early cake follows an early cake by the same distance of being ahead, the noser can stay where it is. Similarly, when a late cake follows a late cake by the same distance of being behind, the noser may remain in the same position. However, the noser may need to be adjusted depending upon varying degrees of an article being early or late. FIG. 10 illustrates an early cake followed by an on-time cake. The noser must extend a distance of (S/P1)P2 to get to the on-time position. The noser must complete this move by the time the on-time cake has at least about ⅓ of itself still on belt 1. The on-time cake must move a distance of 2S+(S/P1)P2+2L/3. The time available for this move is [2S+(S/P1)P2+2L/3]/V1.

Figure 11:
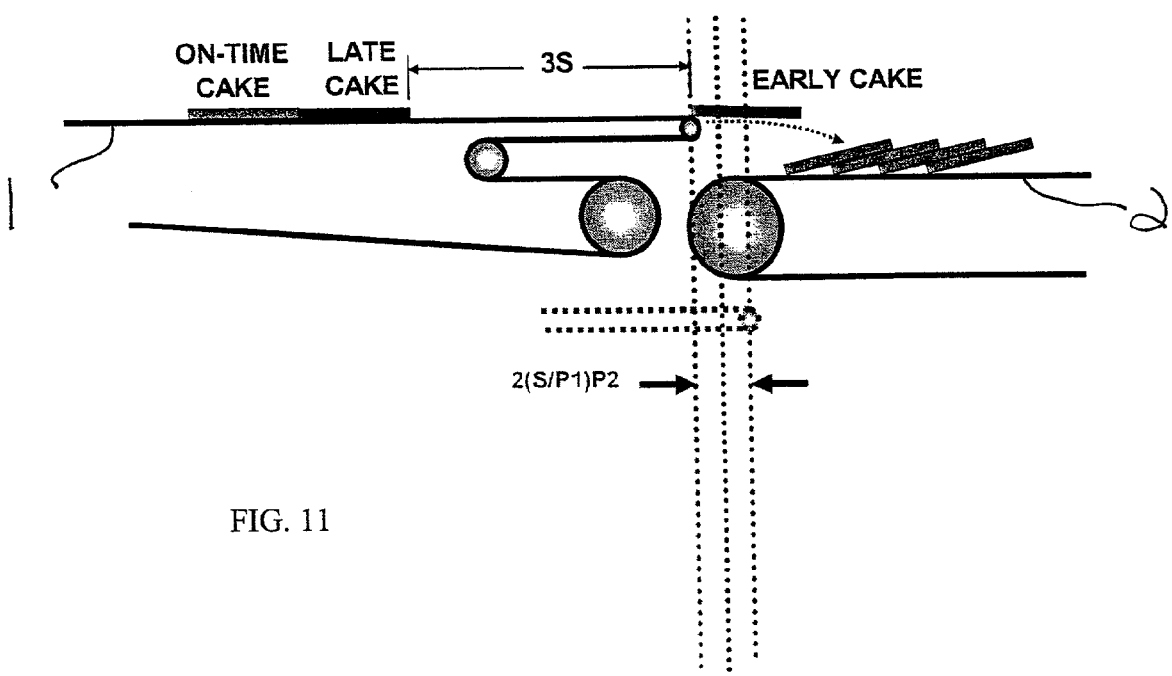
FIG. 11 shows the distance the noser must be extended when an early cake is followed by a late cake.

FIG. 11 illustrates an early cake followed by a late cake. The noser must extend a distance of 2(S/P1)P2 to get to the late position. The noser must complete this move by the time the late cake has at least about ⅓ of itself still on belt 1. The late cake must move a distance of 3S+2(S/P1)P2+2L/3. The time available for this move is [3S+2(S/P1)P2+2L/3]/V1.

Figure 12:
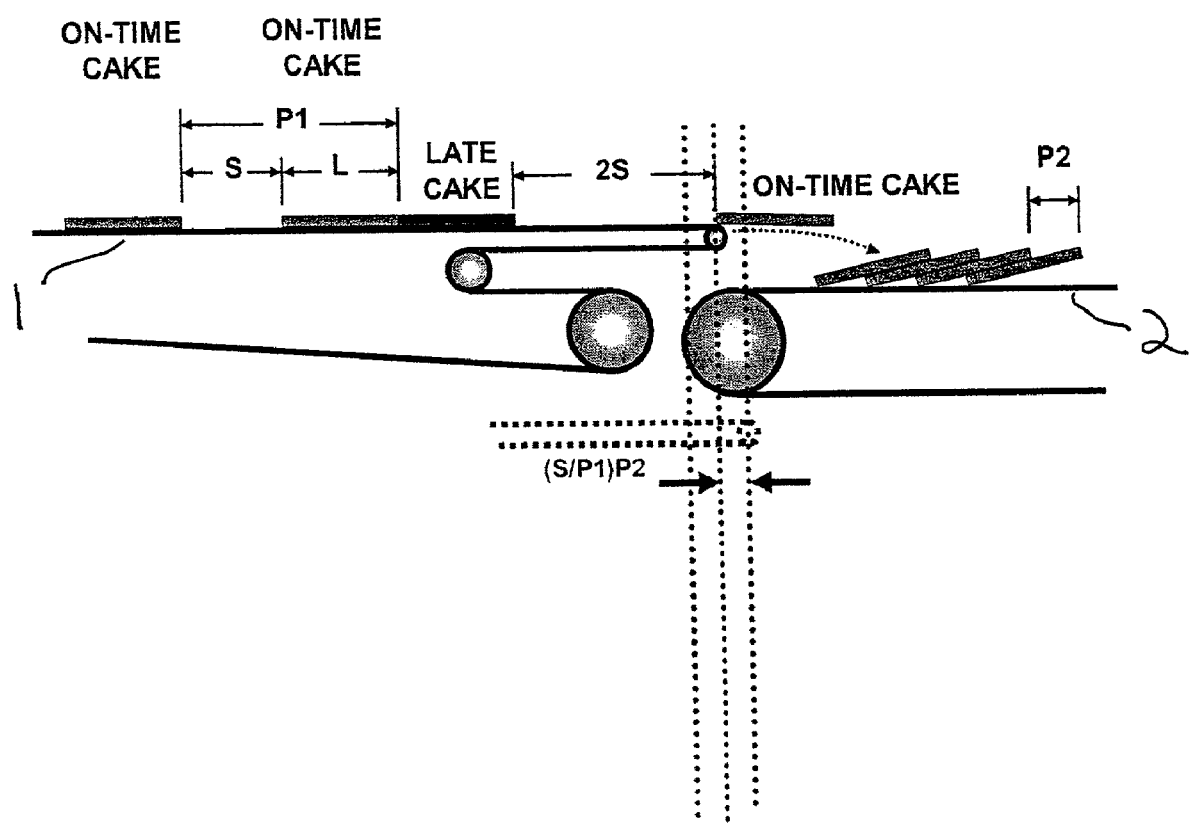
FIG. 12 shows the distance the noser must be extended when an on-time cake is followed by a late cake.

FIG. 12 illustrates an on-time cake followed by a late cake. The noser must extend a distance of (S/P1)P2 to get to the late position. The noser must complete this move by the time the late cake has at least about ⅓ of itself still on belt 1. The late cake must move a distance of 2S+(S/P1)P2+2L/3. The time available for this move is [2S+(S/P1)P2+2L/3]/V1.

Figure 13:
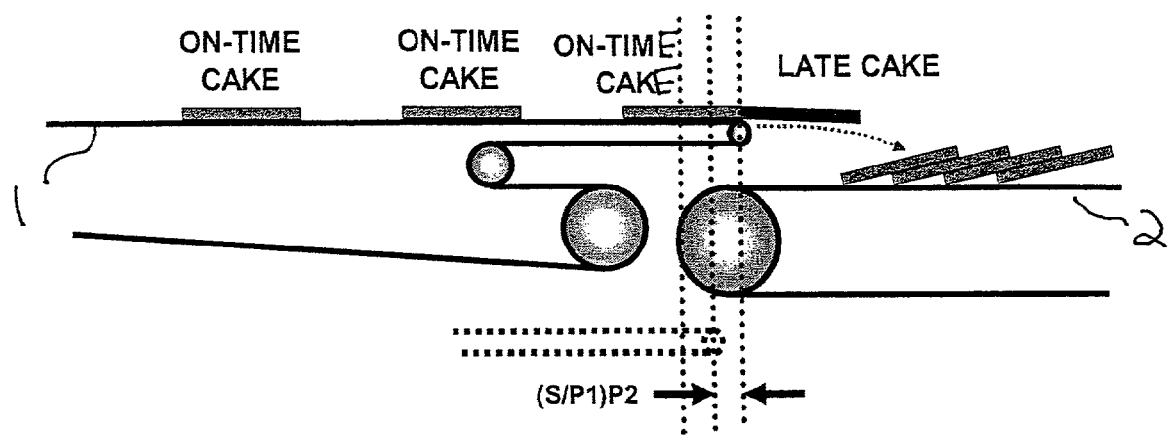
FIG. 13 shows the distance the noser must be retracted when a late cake is followed by an on-time cake.

FIG. 13 illustrates a late cake followed by an on-time cake. The noser must retract a distance of (S/P1)P2 to get to the on-time position. The noser must complete this move by the time the on-time cake has at least about ⅓ of itself still on belt 1. The on-time cake must move a distance of 2L/3−(S/P1)P2. The time available for this move is [2L/3−(S/P1)P2]/V1.

In view of the calculated distance and time in which the noser has to move based upon detection of an unevenly-spaced article and the pitch on the first and second conveyors, the calculation of the acceleration of the noser can be determined.

III. Acceleration of Noser

Figure 14:
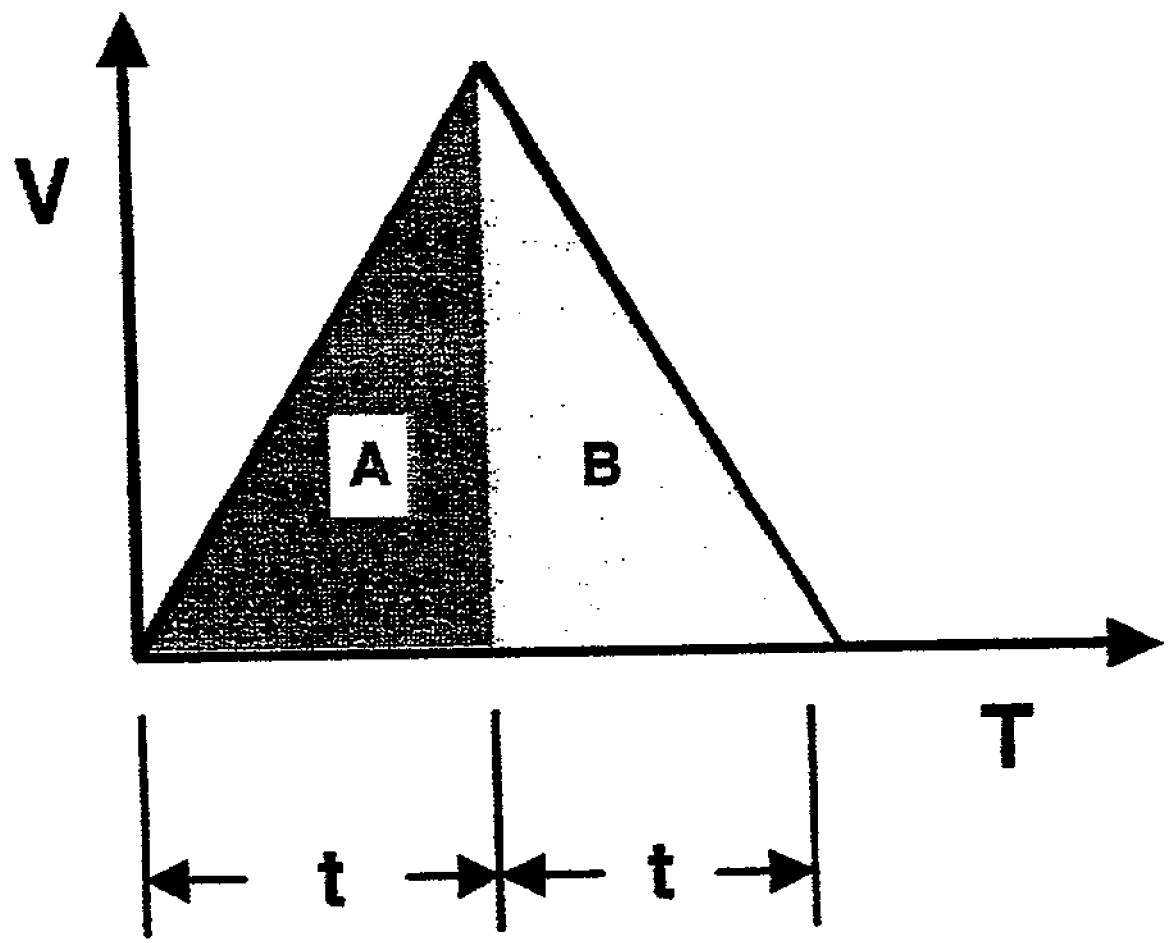
FIG. 14 is a graph of velocity versus time for calculating acceleration and deceleration of the noser.

In the following discussion, it is assumed that the noser accelerates in one direction at a constant rate until it starts slowing down. Similarly, it is assumed that the rate of deceleration is also constant and of the same magnitude. The corresponding velocity graph shown in FIG. 14 is therefore quite simple. However, the noser may actually have varying rates of acceleration and deceleration.

In FIG. 14, for Area "A", $x=\int\int a\,dt = at^2/2 + vt + k$, wherein a=acceleration; v=velocity; t=time; x=distance; and k=initial distance. When the initial velocity, v, is zero and the initial distance, k is zero, then:

$x = at^2/2$

Area "A"=Area "B"=x.

The total distance traveled is $2x = 2(at^2/2) = at^2$. Thus, a=Total Distance Traveled/$t^2$.

The following Example is for a process that corrects the uneven spacing of graham crackers as they are transferred from a first conveyor belt and shingled onto a second conveyor belt, so that each article has the same or substantially the same angle Theta relative to the top surface of the belt. Table 1 shows the input data: product length, product thickness, gap, product rate, and shingle angle. Table 2 shows the calculated data: pitch on first belt, pitch on second belt, speed of first belt, time/pitch, and speed of second belt. Table 3 shows the time available to move the noser, distance correction, speed, and acceleration of the noser for a variety of unevenly spaced conditions:

IV. EXAMPLE

TABLE 1

INPUT DATA

| Product I.D. | Product Length - C (In direction of Travel). Inches | Product Thickness - T. Inches | Gap - S between products. Inches | Production/ Min. Fixed Passing Fixed Observer | Shingle Angle of Product on Second Belt (measured from horizontal). THETA. Degrees |
|---|---|---|---|---|---|
| GRAHAM | 2.5 | 0.2244 | 2 | 400 | 13 |

TABLE 2

CALCULATED DATA

| Product I.D. | Pitch on First Belt (Product Length & Gap) P1 Inches | Pitch On Second Belt - P2 Inches | Speed of First Belt (pitch × products/sec) - V1 Inches/Sec | Speed of First Belt FT/min. | Time/ Pitch Seconds | Speed of Second Belt V2 Inches/Sec. |
|---|---|---|---|---|---|---|
| GRAHAM | 4.5 | 0.9976 | 30.00 | 150.00 | 0.1500 | 6.650 |

TABLE 3

| CALCULATED DATA | On Time Followed By Early | On Time Followed By On Time | On Time Followed By Late | Early Followed By Early | Early Followed By On Time | Early Followed By Late | Late Followed By Early | Late Followed By On Time | Late Followed By Late |
|---|---|---|---|---|---|---|---|---|---|
| Time Available to Move Noser For Max. Product Position Correction. Seconds | 0.0408 | Noser Remains Where It is | 0.2307 | Noser Remains Where It is | 0.2307 | 0.2851 | Two Products Occupying Same Space, Cannot Correct | 0.0408 | Noser Remains Where It is |
| Distance Noser Moves To Correct Product Position. Inches | −0.4434 | 0.0000 | 0.4434 | 0.0000 | 0.4434 | 0.8867 | 0.0000 | −0.4434 | 0.0000 |
| Average Noser Speed During Max. Correction. Inches/Sec. | −10.8727 | 0.0000 | 2.1769 | 0.0000 | 2.1769 | 3.1100 | 0.0000 | −10.8727 | 0.0000 |
| Acceleration During Noser Movement (assuming a constant and equal rate of acceleration and deceleration). Inches/Sec.$^2$ | −1,066.5496 | 0.0000 | 42.7533 | 0.0000 | 42.7533 | 43.6324 | 0.0000 | −1,066.5496 | 0.0000 |
| Acceleration In G's | −2.7775 | 0.0000 | 0.1113 | 0.0000 | 0.1113 | 0.1136 | 0.0000 | −2.7775 | 0.0000 |

As shown in Table 3, all accelerations in the Example are at a low level of about 0.1 G except for two conditions. For ON TIME FOLLOWED BY EARLY and LATE FOLLOWED BY ON TIME, where there is less time to make a correction, the carriage moves at a faster rate of about 2.7 G. Servos that have the agility to obtain this level of acceleration are commercially available.

What is claimed is:

1. A process for correcting uneven spacing of successive articles in a shingling operation, comprising:
   carrying a sequence of a plurality of articles on a first conveyor belt, wherein at least one article is unevenly spaced, having a different pitch than the pitch of another article on the first conveyor belt; and
   transferring the plurality of articles to a second conveyor belt located downstream of the first conveyor belt; wherein, when a position of the at least one unevenly spaced article is detected, a discharge end of the first conveyor belt is extended or retracted a distance based upon the pitch of the articles on the first conveyor belt and the pitch of the articles on the second conveyor belt, thereby moving a point of arrival for the at least one unevenly spaced article on the second conveyor belt upstream or downstream, resulting in uniform stacking of the plurality of articles in a shingled manner on the second conveyor belt, wherein the plurality of articles on the second conveyor belt have substantially the same pitch.

2. A process according to claim 1, wherein the first conveyor belt has a greater speed than the speed of the second conveyor belt.

3. A process according to claim 1, wherein when the at least one unevenly spaced article is detected as being early in the sequence, the discharge end of the first conveyor belt is retracted.

4. A process according to claim 1, wherein when the at least one unevenly spaced article is detected as being late in the sequence, the discharge end of the first conveyor belt is extended.

5. A process according to claim 1, further comprising detecting a position of each article with at least one sensor.

6. A process for correcting uneven spacing of successive articles in a shingling operation, comprising:
carrying a sequence of a plurality of articles on a first conveyor belt, wherein at least one article is unevenly spaced; and
transferring the plurality of articles to a second conveyor belt located downstream of the first conveyor belt;
wherein, when a position of the at least one unevenly spaced article is detected, a discharge end of the first conveyor belt is extended or retracted, thereby moving a point of arrival for the at least one unevenly spaced article on the second conveyor belt upstream or downstream, resulting in uniform stacking of the plurality of articles in a shingled manner on the second conveyor belt,
wherein the distance which the discharge end is extended or retracted is determined based upon the pitch of the articles on the first conveyor belt and the pitch of the articles on the second conveyor belt.

7. A process according to claim 6, wherein the angle of articles on the second conveyor belt is between about 5 degrees and about 45 degrees, relative to the top surface of the second conveyor belt.

8. A process according to claim 1, wherein the articles comprise a food product.

9. A process according to claim 8, wherein the food product is selected from the group consisting of crackers, cookies, biscuits, and candies.

10. A process according to claim 8, wherein the food product is in the form of a strip extending across the first conveyor belt and comprises a plurality of perforated sections.

11. A process for shingle stacking a food product, comprising:
carrying a sequence of a food product on a first conveyor belt, wherein at least one food product is unevenly spaced, having a different pitch than the pitch of another article on the first conveyor belt;
detecting the position of each food product; and
transferring the food product to a second conveyor belt located downstream of the first conveyor belt;
wherein, when a position of the at least one unevenly spaced food product is detected, a discharge end of the first conveyor belt is extended or retracted a distance based upon the pitch of the articles on the first conveyor belt and the pitch of the articles on the second conveyor belt, thereby at least substantially uniformly stacking the sequence of food product in a shingled manner on the second conveyor belt, wherein the plurality of articles on the second conveyor belt have substantially the same pitch, and
wherein the food product is selected from the group consisting of crackers, cookies, biscuits, and candies.

12. A process for correcting uneven spacing of successive articles, comprising:
carrying a sequence of a plurality of articles on a first conveyor belt, wherein at least one article is unevenly spaced, having a different pitch than the pitch of another article on the first conveyor belt; and
transferring the plurality of articles to a second conveyor belt located downstream of the first conveyor belt;
wherein, when a position of the at least one unevenly spaced article is detected, a discharge end of the first conveyor belt is extended or retracted a distance based upon the pitch of the articles on the first conveyor belt and the pitch of the articles on the second conveyor belt, thereby moving a point of arrival for the at least one unevenly spaced article on the second conveyor belt upstream or downstream, resulting in uniform spacing of the plurality of articles on the second conveyor belt and correcting the uneven spacing of the at least one unevenly spaced article, wherein the plurality of articles on the second conveyor belt have substantially the same pitch.

13. A process according to claim 12, wherein the first conveyor belt and the second conveyor belt are on the same level.

14. A process according to claim 1, wherein said uniform stacking of the plurality of articles is continuous.

15. A process according to claim 5, wherein the at least one sensor comprises at least one photoelectric eye arranged above the first conveyor belt.

16. A process according to claim 5, wherein the at least one sensor transmits a signal to a computing device that compares the length, spacing, and pitch of articles on the first conveyor belt.

17. A process according to claim 11, wherein said at least substantially uniform stacking of the sequence of food product is continuous.

18. A process according to claim 12, wherein said uniform spacing of the plurality of articles is continuous.

19. A process according to claim 11, further comprising detecting a position of each article with at least one sensor, wherein the at least one sensor transmits a signal to a computing device that compares the length, spacing, and pitch of articles on the first conveyor belt.

20. A process according to claim 12, further comprising detecting a position of each article with at least one sensor, wherein the at least one sensor transmits a signal to a computing device that compares the length, spacing, and pitch of articles on the first conveyor belt.

21. A process for correcting uneven spacing of successive articles in a shingling operation, comprising:
carrying a sequence of a plurality of articles on a first conveyor belt, wherein at least one article is unevenly spaced, and each article comprises a food product in the form of a strip extending across the first conveyor belt and has a plurality of perforated sections; and
transferring the plurality of articles to a second conveyor belt located downstream of the first conveyor belt;
wherein, when a position of the at least one unevenly spaced article is detected, a discharge end of the first conveyor belt is extended or retracted, thereby moving a point of arrival for the at least one unevenly spaced article on the second conveyor belt upstream or downstream, resulting in uniform stacking of the plurality of articles in a shingled manner on the second conveyor belt.

* * * * *